(12) United States Patent
Miyamoto

(10) Patent No.: US 7,126,124 B2
(45) Date of Patent: Oct. 24, 2006

(54) MARKING DETERMINING METHOD AND MARKING DETERMINING APPARATUS

(75) Inventor: Haruhiko Miyamoto, Shizuoka-ken (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 172 days.

(21) Appl. No.: 10/846,709

(22) Filed: May 17, 2004

(65) Prior Publication Data

US 2004/0232341 A1 Nov. 25, 2004

(30) Foreign Application Priority Data

May 19, 2003 (JP) ............................. 2003-140693

(51) Int. Cl.
*G01J 5/02* (2006.01)
*G01N 21/86* (2006.01)
*G01V 8/10* (2006.01)

(52) U.S. Cl. ............. 250/340; 250/339.14; 250/559.44

(58) Field of Classification Search .......... 250/339.11, 250/341.8, 559.44, 339.04, 339.14, 340, 250/341.6, 342, 271, 358.1, 347; 382/112; 374/121, 129

See application file for complete search history.

(56) References Cited

U.S. PATENT DOCUMENTS

| 5,401,960 | A | * | 3/1995 | Fisun et al. ................ 250/271 |
| 6,024,020 | A | * | 2/2000 | Romano et al. ............ 101/484 |
| 6,768,504 | B1 | * | 7/2004 | Crawley et al. ............ 347/224 |
| 6,876,377 | B1 | * | 4/2005 | Endo et al. ................. 347/225 |

FOREIGN PATENT DOCUMENTS

| EP | 1 310 824 A2 | 5/2003 |
| GB | 1372753 | 11/1974 |
| JP | 47-13797 | 10/1972 |
| JP | 53-127342 U | 10/1978 |
| JP | 57-124586 A | 8/1982 |
| JP | 59-27791 A | 2/1984 |
| JP | 59-50434 B2 | 3/1984 |
| JP | 59-97788 A | 6/1984 |
| JP | 59-163089 A | 9/1984 |
| JP | 60-108061 A | 6/1985 |
| JP | 62-77195 A | 4/1987 |

(Continued)

OTHER PUBLICATIONS

Machine Assisted Translation of Japanese Publication 10-350377, published Nov. 17, 1998.*

(Continued)

*Primary Examiner*—David Porta
*Assistant Examiner*—Frederick F. Rosenberger
(74) *Attorney, Agent, or Firm*—Birch, Stewart, Kolasch & Birch, LLP

(57) ABSTRACT

The present invention realizes accurate determination on marking without using an infrared sensor having high responsiveness and high precision. An infrared sensor is disposed such that a region of a predetermined range on the downstream side in the feed direction of an X-ray film with respect to a scan line, the region including the scan line as a laser beam irradiation position, becomes a detection region. Not only an infrared ray emitted from the laser beam irradiation position but also infrared rays emitted from a plurality of dots formed on the X-ray film irradiated with a laser beam can be also detected by the infrared sensor. Consequently, an output from the infrared sensor is stabilized and by comparing the output with a threshold, occurrence of erroneous printing, poor printing, and the like can be accurately detected.

15 Claims, 11 Drawing Sheets

| | FOREIGN PATENT DOCUMENTS | |
|---|---|---|
| JP | 64-87713 A | 3/1989 |
| JP | 4-272122 A | 9/1992 |
| JP | 63-190115 A | 8/1998 |
| JP | 10-305377 A | 11/1998 |

OTHER PUBLICATIONS

Machine Assisted Translation of Japanese Publication 10-305377, published Nov. 17, 1998 (included with last Office action).*

* cited by examiner

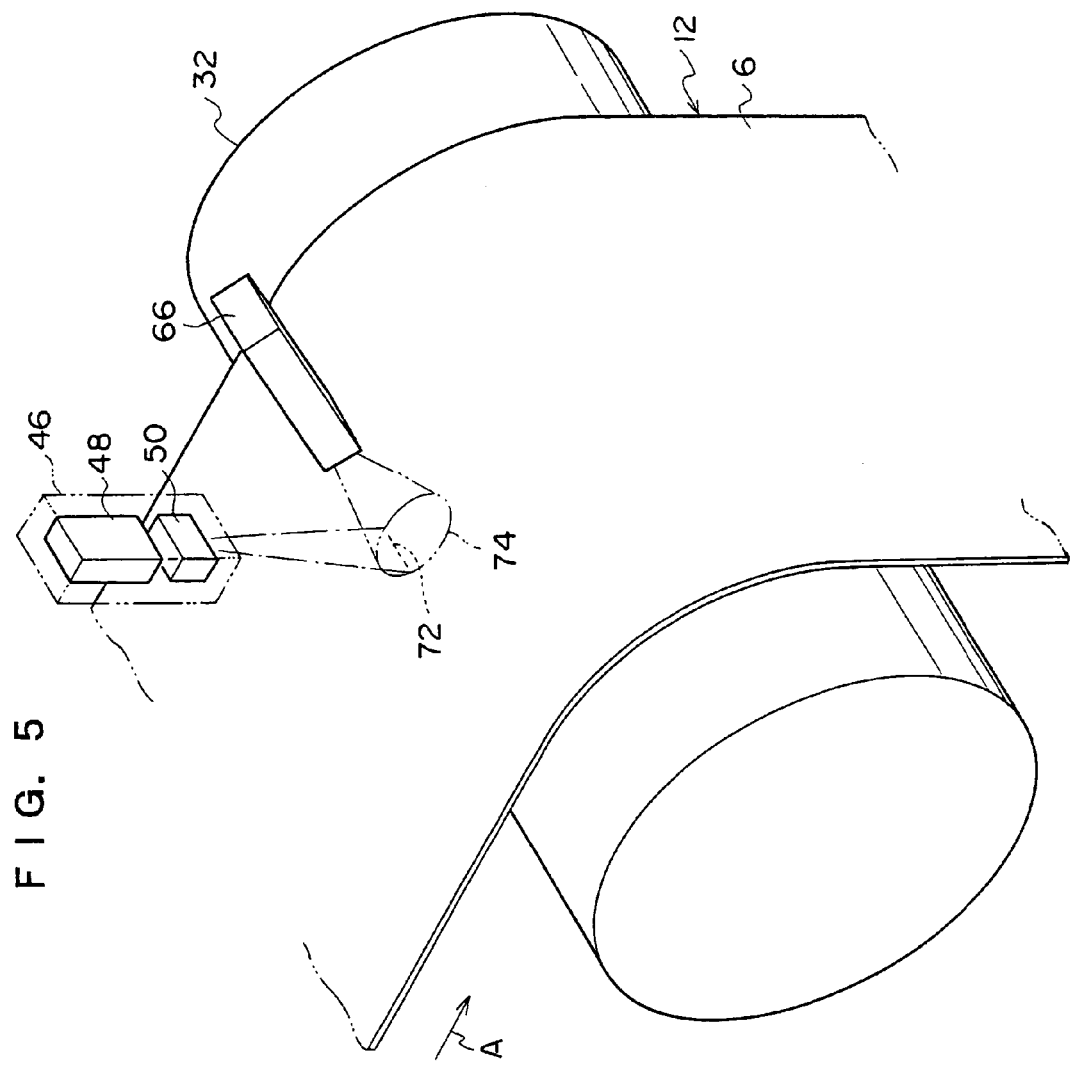

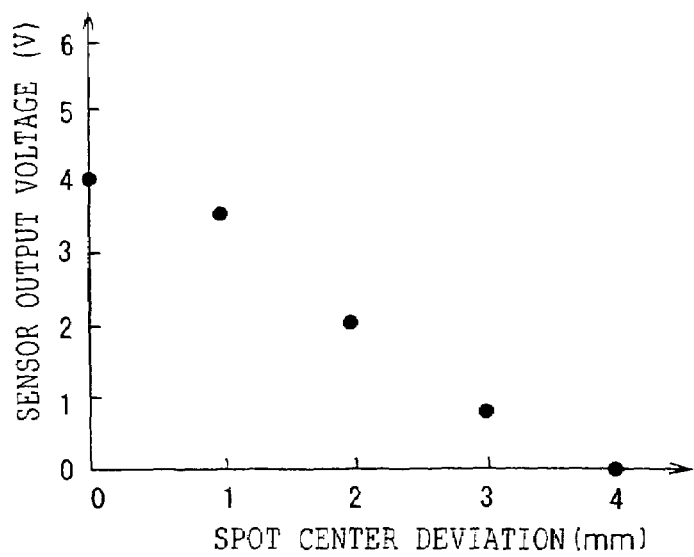
F I G. 6A
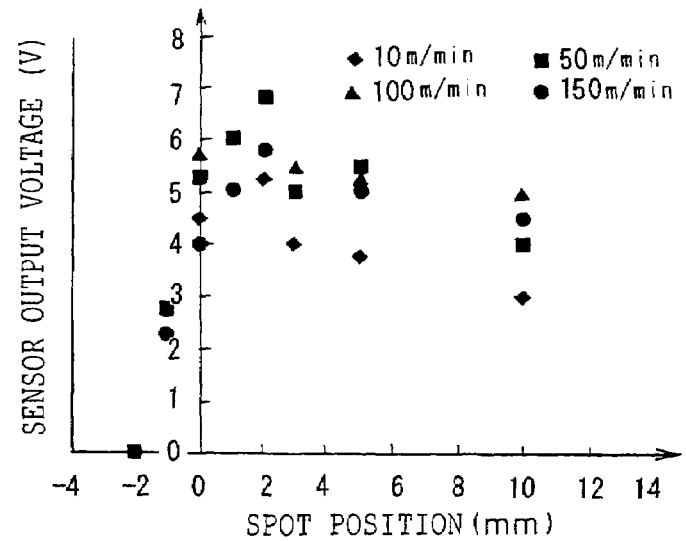
F I G. 6B
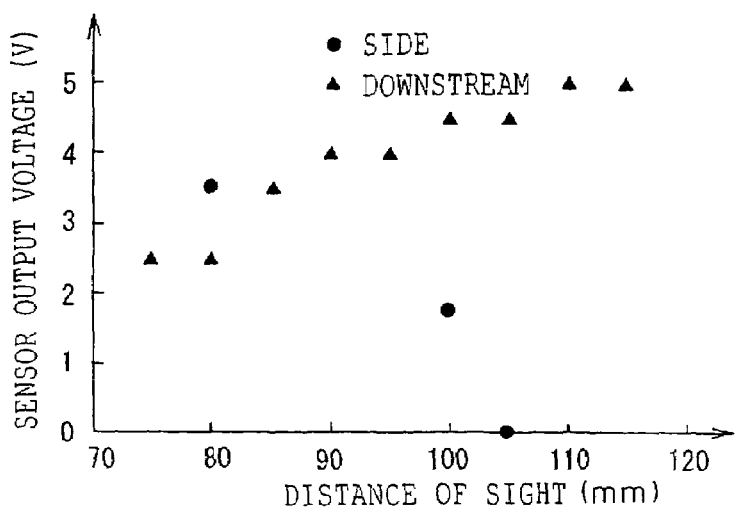
F I G. 6C

MARKING DETERMINING METHOD AND MARKING DETERMINING APPARATUS

CROSS-REFERENCE TO RELATED APPLICATION

This Non-provisional application claims priority under 35 U.S.C. § 119(a) on Patent Application No(s). 2003-140693 filed in Japan on May 19, 2003, the entire contents of which are hereby incorporated by reference.

BACKGROUND OF THE INVENTION

1. Field of the Invention

The present invention relates to laser marking for irradiating a material to be printed such as a photosensitive material with a laser beam and forming a predetermined marking pattern such as a character, a sign, or the like by dots which can be visually recognized on the material to be printed. More particularly, the invention relates to a marking determining method and apparatus for determining a marking position and whether a marking pattern is proper or not.

2. Description of the Related Art

By using a laser beam, a marking pattern by dots can be formed on the surface of a material to be printed such as a photosensitive material. In the case of printing the material to be printed by using a laser beam, the material to be printed is irradiated with a laser beam oscillated by a laser oscillator and condensed to a spot. It causes thermal deformation or the like on the material to be printed, thereby forming a dot. By a scan of a laser beam, a dot matrix according to a character, a sign, or the like is formed.

On the other hand, in dot marking on the photosensitive material or the like with a laser beam, the laser beam is oscillated only at the time of forming a dot. The laser oscillation is stopped in a space on which the dot marking is not performed, thereby saving energy consumption and suppressing heat generation. In such a manner, occurrence of deterioration in quality such as a change in the photosensitive material as the material to be printed due to heat is prevented.

Consequently, the laser oscillator frequently repeats turn-on/turn-off (oscillation/stop oscillation) in extremely short time.

When the dot marking is performed with the laser beam oscillated by frequently repeating turn-on/turn-off in extremely short time, a marking dropout, marking at a wrong timing, or the like may occur due to a failure in an internal part, noises from the outside, and the like. To prevent such poor printing, an in-line test is required.

One of in-line test methods in a process using a laser beam or the like is a method of measuring temperature by detecting an infrared ray emitted from a laser beam irradiation position on a material to be processed at the time of irradiating the material to be processed such as a material to be printed with a laser beam (refer to, for example, Japanese Patent Application Publication (JP-B) No. 59-50434).

Another method is proposed such that, for example, at a time of opening a hole by using an energy beam such as a laser beam, an infrared ray or a thermo electron generated from a melted material around the processed hole are detected and a process state is determined from the intensity and a change in temporal response or thermo electrons (refer to, for example, Japanese Patent Application Laid-Open (JP-A) No. 62-77195).

Further, a method of determining a process state at the time of processing a thin resin film such as an enveloping material with a laser by detecting the surface temperature of a material to be processed in an irradiation position of a laser beam has been proposed (refer to, for example, JP-A No. 10-305377).

However, at the time of performing dot marking by using a photosensitive material as a material to be printed and irradiating the photosensitive material with a laser beam, irradiation time of the laser beam for one dot is extremely short. Therefore, at a time of emitting a laser beam, emission energy from the irradiation position is also extremely small. To detect the emission energy from the laser beam irradiation position at a time of emitting the laser beam, a sensor having high sensitivity and responsiveness has to be used.

The sensitivity of a sensor can be improved by enhancing cooling of a sensor element. For this purpose, an increase in size is required for a detecting apparatus and it is difficult to realize it from the viewpoint of cost. A sensor having responsiveness on the order of 10 μsec is not obtained under present circumstances. It is substantially impossible to accurately detect the emission energy from a laser beam irradiation position at a time of emitting the laser beam.

On the other hand, as a marking evaluation method, there is a method of determining whether proper dot marking is performed or not by combining a CCD camera or the like with an imaging process.

However, when light in a visible range is used for a photosensitive material, a problem occurs such that the light deteriorates the product quality of the photosensitive material. Consequently, it cannot but depend on a sampling inspection or the like to determine the marking result when dot marking is performed on a photosensitive material with a laser beam.

In the sampling inspection, however, a marking result is tested after completion of marking of one long photosensitive material. Therefore, a problem occurs such that a large amount of the photosensitive material is wasted when a failure such as a marking drop is detected. When an inspection omission occurs, a problem arises such that a number of defective products are manufactured.

SUMMARY OF THE INVENTION

The present invention has been achieved in consideration of the facts mentioned above and its object is to propose a marking determining method and apparatus capable of easily and accurately determining a marking state without deteriorating product quality at a time of performing dot marking by irradiating a material to be printed such as a photosensitive material with a laser beam.

A marking determining method of the invention for achieving the object is a method of determining marking when a marking pattern is formed by forming and arranging dots in a predetermined position on a material to be printed with irradiation of a laser beam while feeding the material to be printed, wherein an infrared sensor is disposed so as to be able to detect the plurality of dots, which are formed on the material to be printed by irradiation of the laser beam, on the downstream side in the feed direction of the material to be printed with respect to an irradiation position of the laser beam, and whether marking is proper or not is determined by comparing an output of the infrared sensor according to an amount of infrared rays emitted from the material to be printed with a preset threshold.

According to the invention, at the time of forming a marking pattern of array of dots (dot array) by irradiating the material to be printed with a laser beam, infrared rays emitted from the material to be printed are detected by using the infrared sensor. The infrared ray detection region includes a plurality of dots formed on the material to be printed by being irradiated with a laser beam.

Thus, at the time of forming the dot array on the material to be printed, irrespective of the responsiveness and detection precision of the infrared sensor, outputs of the infrared sensor are stabilized. Since a large amount of infrared rays can be detected, an output of the infrared sensor becomes large and a high S/N ratio can be obtained.

Therefore, by comparing the output of the infrared sensor with the present threshold, whether proper marking is performed or not can be properly determined.

In the marking determining method of the invention, the irradiation position of the laser beam onto the material to be printed may be included in the detection region of the infrared ray from the material to be printed of the infrared sensor. With the configuration, when a marking pattern is formed on the material to be printed, an output of the infrared sensor becomes large and marking determination can be made more accurately.

In the marking determining method of the invention, when an output of the infrared sensor is less than the threshold in the marking region in which the marking pattern is to be formed on the material to be printed, poor printing may be determined. When an output of the infrared sensor exceeds the threshold in a region out of the marking region in which the marking pattern is to be formed on the material to be printed, erroneous printing may be determined.

At the time of making such determination, the threshold for the marking region and that for the non-marking region out of the marking region may be separately set and, according to marking states, may be switched. It realizes more accurate marking determination.

The invention also provides a marking determining apparatus for determining whether marking on a material to be printed is proper or not, the marking being formed by a marking apparatus which includes: a carrying section for carrying the material to be printed; a laser oscillating section capable of forming a dot by irradiating the material to be printed which is carried by the carrying section with a laser beam at a predetermined position; a laser control section for controlling the laser oscillating section to form a marking pattern by arranging dots in a predetermined position in the material to be printed, the marking determining apparatus comprising: an infrared sensor provided so as to be able to detect a plurality of the dots, which are formed on the material to be printed by irradiation with laser beams, on the downstream side in the feed direction of the material to be printed with respect to an irradiation position of the laser beam on the material to be printed, which position is irradiated with the laser beam oscillated by the laser oscillating section; and a determining section for determining whether marking on the material to be printed is proper or not by comparing an output of the infrared sensor according to an amount of an infrared ray emitted from the material to be printed with a preset threshold.

In the marking determining apparatus of the invention, preferably, a detection region of the infrared ray from the material to be printed of the infrared sensor includes the laser beam irradiation position on the material to be printed.

In the marking determining apparatus of the invention, the determining section may determine poor printing when an output of the infrared sensor is less than the threshold in a marking region in which the marking pattern is to be formed on the material to be printed. The determining section may determine erroneous printing when an output of the infrared sensor exceeds the threshold in a region out of the marking region in which the marking pattern is to be formed on the material to be printed.

Further, the marking determining apparatus of the invention provides that, when the marking apparatus outputs at least a trigger signal indicative of start of irradiation of the material to be printed with a laser beam, the determining section determines whether marking is proper or not on the basis of the trigger signal.

According to the invention, whether the detection region of the infrared sensor is the marking region or the non-marking region on the basis of the trigger signal output from the marking apparatus. At this time, if at least the trigger signal indicative of start of marking is input, it can be determined whether the region is the marking region or the non-marking region.

Thus, whether marking on a material to be printed is proper or not can be accurately determined in-line.

In the invention, for example, by adding results of determination of the determining section while detecting the feed amount of the material to be printed by a rotary encoder or the like, a region in which erroneous printing or poor printing occurs can be specified.

Consequently, by extracting that region after marking, without deteriorating the productivity of the marking apparatus, a loss of the material to be printed can be suppressed.

Further, in the marking determining method and apparatus of the present invention, it is preferable that a center position of a detection region of the infrared sensor for the infrared ray from the material to be printed is positioned at the downstream side in the feed direction of the material to be printed with respect to the irradiation position of the laser beam onto the material to be printed.

Further, it is possible that, when an output of the infrared sensor is less than a first threshold in a marking region in which the marking pattern is to be formed on the material to be printed, poor printing is determined, and when an output of the infrared sensor exceeds a second threshold in a region out of the marking region, erroneous printing is determined. In this case, the first threshold is larger than the second threshold.

As the material to be printed, which is applied to the invention, particularly, a photosensitive material is preferred, and using such the material, a product on which marking is properly made can be manufactured without deteriorating the product quality of the photosensitive material.

BRIEF DESCRIPTION OF THE DRAWINGS

FIG. 5 is a schematic perspective view of a main portion around a print roll.

FIG. 6A is a schematic diagram showing an output voltage according to a deviation of a spot center position of an infrared sensor from a marking position, FIG. 6B is a schematic diagram showing an output voltage according to line speed in the spot position along a feed direction of an X-ray film with respect to the marking position, and FIG. 6C is a schematic diagram showing an output voltage of an infrared sensor with respect to a change in a distance of sight.

FIG. 9A shows a normal state, FIG. 9B shows an example of poor printing, and FIG. 9C shows an example of erroneous printing.

DESCRIPTION OF THE PREFERRED EMBODIMENT

Figure 1:
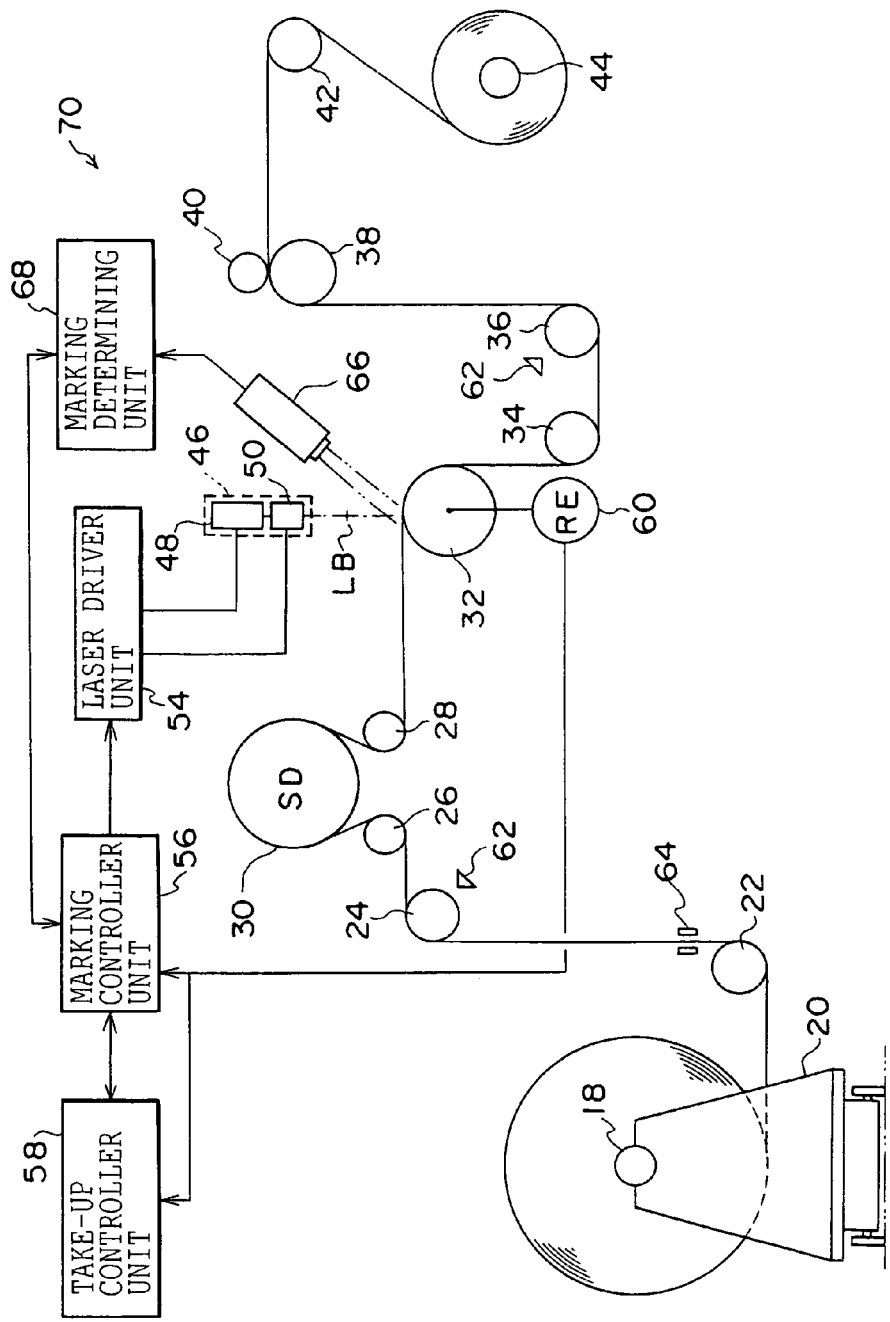
FIG. 1 is a schematic configuration diagram of a marking apparatus applied to an embodiment.
Figure 4:
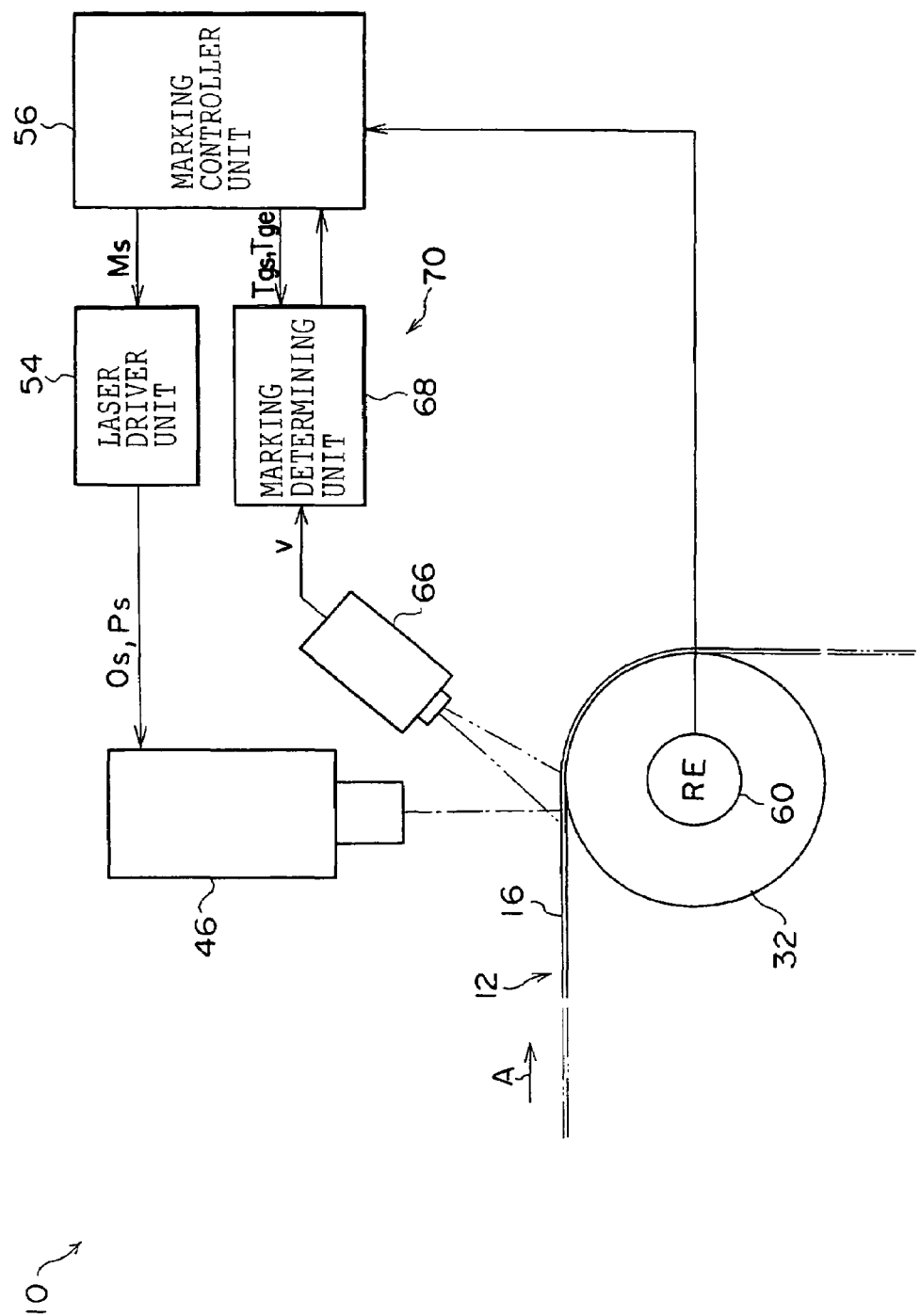
FIG. 4 is a schematic configuration diagram of a main portion of the marking apparatus for marking an X-ray film and determining a marking result.

An embodiment of the present invention will be described hereinbelow with reference to the drawings. FIGS. 1 and 4 show a schematic configuration of a marking apparatus 10 applied in the embodiment. In the marking apparatus 10, an X-ray film 12 as a kind of a photosensitive material for medical use is used as a material to be printed. The marking apparatus 10 forms a marking pattern of a character, a symbol, or the like by irradiating the surface of the X-ray film 12 with a laser beam LB in a process of feeding the X-ray film 12.

Figure 2:
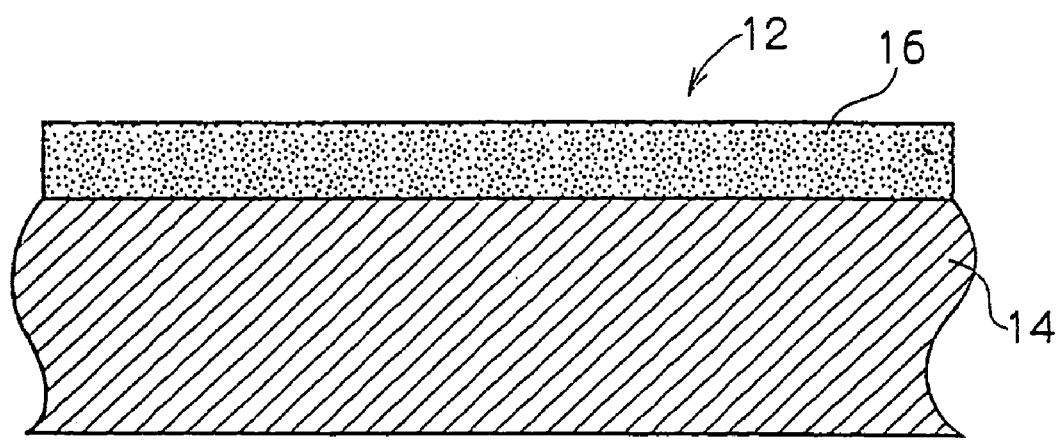
FIG. 2 is a schematic configuration diagram of an X-ray film 12 applied as a photosensitive material in the embodiment.

As shown in FIG. 2, the X-ray film 12 is a photosensitive material including a base layer 14 made of PET (polyethylene terephthalate) as a substrate and an emulsion layer 16 formed on at least one of surfaces of the base layer 14.

As shown in FIG. 1, the X-ray film 12 as a film wound around a core 18 in a roll shape is mounted on the marking apparatus 10, for example, in a state where the core 18 is supported by a skid 20. The X-ray film 12 mounted on the marking apparatus 10 is pulled from the outermost layer, for example, on the bottom side of the core 18.

In the marking apparatus 10, path rolls 22 and 24 are disposed in upper and lower parts adjacent to the skid 20. The X-ray film 12 pulled from the outermost layer is passed along the path roll 22 on the lower side and is directed upward. After that, the X-ray film 12 is passed along the path roll 24 and is directed horizontally.

On the downstream side in the feed direction of the path roll 24 (on the side of the arrow A in FIG. 1), a pair of small rolls 26 and 28 are disposed, and a feed roll 30 is disposed between the small rolls 26 and 28. The X-ray film 12 is passed around the main feed roll 30 between the small rolls 26 and 28. In the following, the feed direction of the X-ray film 12 is indicated as the direction of the arrow A.

In the main feed roll 30, a number of small holes (not shown) are formed in a peripheral surface. By a negative pressure supplied from a not-shown negative voltage source to the small holes, the main feed roll 30 functions as a suction roll for sucking and holding the X-ray film 12 passed around the peripheral surface. The main feed roll 30 is rotary drove by the driving force of a not-shown driving means.

With the configuration, the X-ray film 12 is passed around the main feed roll 30 and is carried at a travel speed (line speed) according to the rotational speed of the main feed roll 30.

A print roll 32 is disposed on the downstream side of the small roll 28, and the X-ray film 12 passed along the small roll 28 and fed in the horizontal direction is passed along the print roll 32.

Below the print roll 32, path rolls 34 and 36 are disposed. A sub feed roll 38 is disposed above the path roll 36.

The X-ray film 12 directed downward by being passed along the print roll 32 runs along the path rolls 34 and 36. After that, the X-ray film 12 is directed upward and passed along the sub feed roll 38.

A backup roll 40 is disposed so as to face the sub feed roll 38. The sub feed roll 38 is rotary drove by the driving force of a not-shown driving means. The X-ray film 12 is fed through the sub feed roll 38 and the backup roll 40.

A reverse roll 42 is disposed on the downstream side in the feed direction of the X-ray film 12 from the sub feed roll 38, and a core 44 is provided on an almost downstream side of the reverse roll 42.

The X-ray film 12 is passed along the reverse roll 42 and, after that, wound around the core 44. In such a manner, the X-ray film 12 is wound around the core 44 in a roll shape. It is also possible to dispose a slit blade at some midpoint between the print roll 32 and the reverse roll 42, cut the X-ray film 12 every predetermined width, and wind the cut X-ray films 12 around separate cores.

A marking head 46 is provided near the print roll 32. The marking head 46 has a laser oscillator 48 and a beam deflector 50. The X-ray film 12 is irradiated with a laser beam LB while being oscillated with the laser by the laser oscillator 48 and deflected by the beam deflector 50.

In the embodiment, a $CO_2$ laser beam is used as the laser beam LB. The laser oscillator 48 oscillates the $CO_2$ laser beam having a predetermined wavelength on the basis of a pulse drive signal.

The beam deflector 50 has, for example, an AOM (Acousto-Optic Modulator). The beam deflector 50 receives a deflection signal and, on the basis of the deflection signal, scans the laser beam LB oscillated by the laser oscillator 48 along a width direction as a direction orthogonal to the feed direction of the X-ray film 12. By the marking head 46, the laser beam LB scanned by the beam deflector 50 comes into a focus of a predetermined spot diameter on the X-ray film 12 by a not-shown optical system such as a condenser lens.

The marking apparatus 10 has a laser driver 54, a marking controller unit 56, and a take-up controller unit 58.

To the laser driver 54, a pattern signal corresponding to a marking pattern such as a character, a symbol, or the like to be recorded on the X-ray film 12 is input. The pattern signal may be prestored in the marking controller 58 or input from the take-up controller unit 58 to the marking controller unit 56 at a predetermined timing. Alternatively, the pattern signal may be input from a not-shown high-order computer or the like such as a production managing computer to which the marking apparatus 10 is connected.

The laser driver unit 54 outputs a drive signal to the laser oscillator 48 on the basis of the pattern signal to drive the laser oscillator 48 and emit the laser beam LB. The laser driver unit 54 also outputs a deflection signal to the beam deflector 50 to deflect the laser beam LB, thereby scanning the laser beam LB over the X-ray film 12. In the marking apparatus 10, the travel direction of the X-ray film 12 is set as a sub scan direction, the width direction of the X-ray film 12 is set as a main scan direction, and the X-ray film 12 is irradiated with the laser beam LB while being scanned.

When the X-ray film 12 is irradiated with the laser beam LB, the X-ray film 12 absorbs the energy of the laser beam LB. Consequently, as shown in FIG. 3, dots 16A each having, for example, a concave shape is formed in the surface of the emulsion layer 16 in the X-ray film 12.

The laser driver unit 54 turns on/off (oscillates/stops oscillating) the laser oscillator 48 in accordance with the pattern signal at this time, and deflects the laser beam LB, thereby forming a marking pattern MP of a dot pattern according to the pattern signals in the X-ray film 12.

Figure 3:
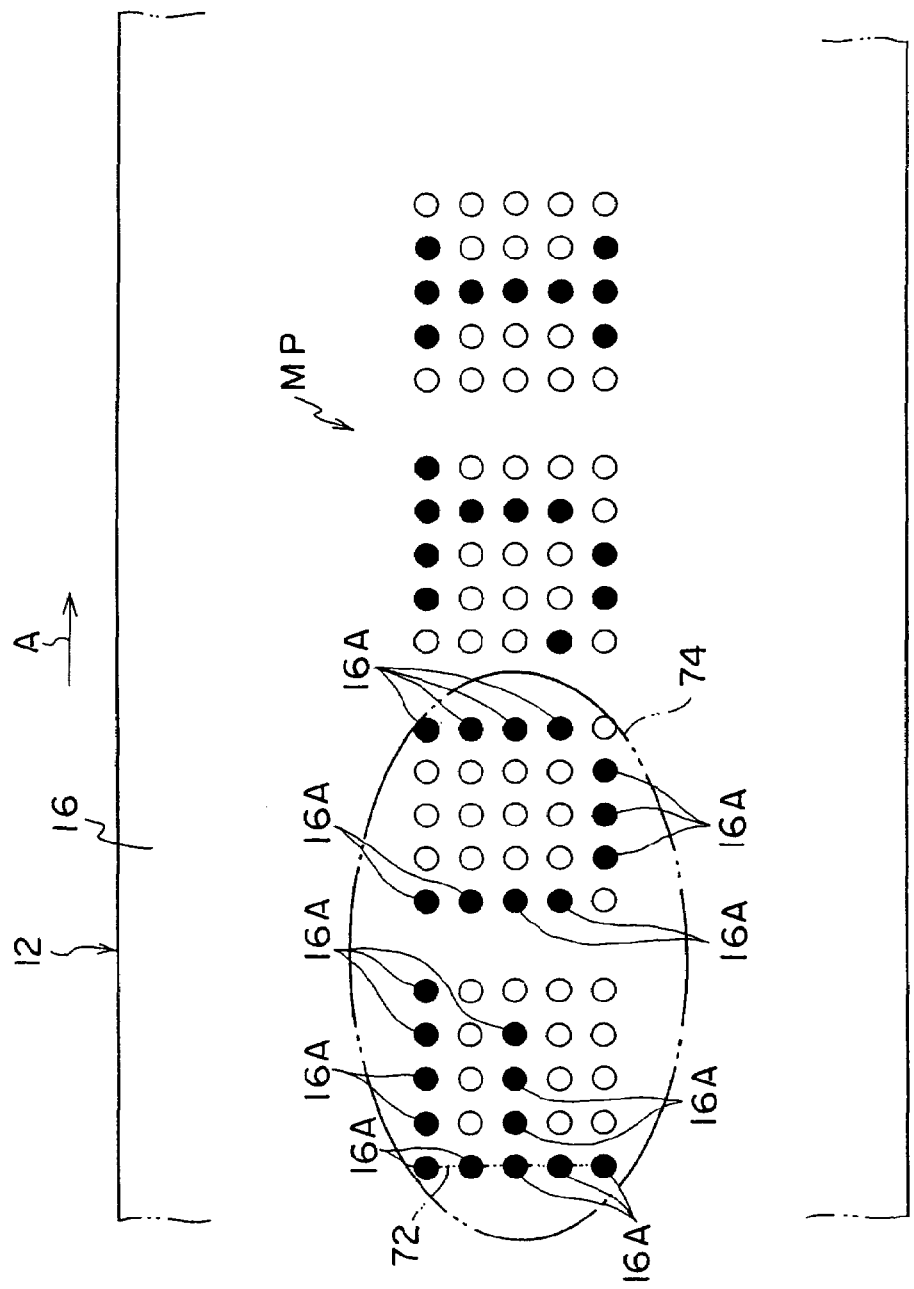
FIG. 3 is a schematic diagram showing an example of a marking pattern formed on an X-ray film and a detection region of an infrared sensor.

FIG. 3 shows an example of forming a plurality of alphabetical letters each by an array of 5×5 dots. In FIG. 3, the dots 16A formed in the X-ray film 12 (emulsion layer 16) with the laser beam LB are shown by painted circles.

In the X-ray film 12, a number of fine air bubbles are created in the dots 16A in a process in which the emulsion layer 16 absorbs the thermal energy of the laser beam LB and melts. In the embodiment, as an example, a projection amount of the dot 16A (for example, a projection amount of the periphery) formed in the emulsion layer 16 is set to 10 µm or less, and the size (diameter) of each bubble is set to 1 to 5 µm.

In the X-ray film 12, a number of air bubbles are formed in the dots 16A, a number of boundary membranes (films) are formed among the air bubbles, and irregular reflection of light is promoted by the boundary films. Consequently, the reflection light amount changes largely between the inside and outside of the dot 16A, so that each of the dots 16A can be recognized visually irrespective of whether the X-ray film 12 is developed or not or whether the density is high or low, and visibility of the dot 16A is improved.

Irradiation time of the laser beam LB for forming such a dot 16A lies in a range from 1 µsec to 15 µsec when the oscillation wavelength of the laser oscillator 48 (wavelength of the laser beam LB) is at the order of 9 µm such as 9.3 µm or 9.6 µm. When the oscillation wavelength of the laser oscillator 48 is at the order of 10 µm such as 10.6 µm, by setting the irradiation time of the laser beam LB to a range from 5 µsec to 18 µsec, the dot 16A as described above can be formed. In the embodiment, to improve work efficiency (marking efficiency), the laser oscillator 48 for oscillating the laser beam LB having a wavelength at the order of 9 µm is used.

As shown in FIG. 1, in the marking apparatus 10, a rotary encoder (RE) 60 is provided for the print roll 32. The rotary encode 60 rotates integrally with a not-shown rotary shaft of the print roll 32, converts the rotational angle of the print roll 32 to a pulse signal, and outputs the pulse signal.

To the take-up controller unit 58, driving means for rotary driving the main feed roll 30, sub feed roll 38, core 44, and the like in addition to the rotary encoder 60 are connected. The take-up controller unit 58 pulls the X-ray film 12 from the skid 20, feeds the X-ray film 12 at a predetermined travel speed (line speed), and takes the X-ray film 12 up around the core 44 in a roll shape. At this time, the take-up controller unit 58 detects the travel speed of the X-ray film 12 from the pulse signal output from the rotary encoder 60 and feeds the X-ray film 12 at the predetermined travel speed.

In the marking apparatus 10, web tension pickups 62 are provided for, for example, the path rolls 24 and 36 and the like. The take-up controller unit 58 controls the rotational speeds of the main feed roll 30, sub feed roll 38, core 44, and the like so that the tension of the X-ray film 12 detected by the web tension pickups 62 becomes constant. While preventing occurrence of a slack or needlessly excessive tension in the X-ray film 12, the take-up controller unit 58 feeds the X-ray film 12 and takes up the X-ray film 12 around the core 44.

Further, in the marking apparatus 10, a web edge control sensor 64 is provided between the path rolls 22 and 24. The take-up controller unit 58 detects the position in the width direction of the X-ray film 12 pulled from the skid 20 by the web edge control sensor 64 and controls the position of the core 18 (position along the axial direction) so that an end portion in the width direction of the X-ray film 12 passes a predetermined position, thereby preventing a lateral deviation of the X-ray film 12.

The take-up controller unit 58 detects the rotational speed of the core 18 by a not-shown sensor and determines the remaining amount and the presence/absence of the X-ray film 12 on the basis of the rotational speed of the core 18 and the travel speed of the X-ray film 12. When it is determined that the X-ray film 12 is going to be finished, the take-up controller unit 58 reduces the speed of the X-ray film 12 and stops it. By connecting the tip of a new X-ray film 12 to the rear end of the X-ray film 12 pulled from the core 18, feeding of the X-ray film 12 is started.

The marking apparatus 10 performs the marking process continuously on each of the X-ray films 12 led from a plurality of films.

On the other hand, the rotary encoder 60 is also connected to the marking controller unit 56. By reading a pulse signal output from the rotary encoder 60, the marking controller unit 56 counts the travel amount of the X-ray film 12 and, each time the count value reaches a preset amount, outputs a pattern signal to the laser driver unit 54 so as to form a marking pattern MP on the X-ray film 12 by the marking head 46.

Specifically, the marking controller unit 56 controls timings of starting the laser driver unit 54 so as to form the marking patterns MP at predetermined intervals in the longitudinal direction of the X-ray film 12.

In the marking apparatus 10 constructed as described above, the X-ray film 12 mounted on the skid 20 is led from the skid 20 and is passed along the print roll 32 while being carried at a predetermined travel speed. After that, the X-ray film 12 is taken up around the core 44 in a roll shape.

At this time, in the marking apparatus 10, each time the X-ray film 12 of a predetermined amount passes the print roll 32, the laser beam LB is emitted from the marking head 46 as scanning the X-ray film 12.

By the operation, the marking patterns MP are formed at predetermined intervals on the X-ray film 12, and the X-ray film 12 on which the marking patterns MP are formed is taken up around the core 44.

As shown in FIGS. 1 and 4, in the marking apparatus 10, an infrared sensor 66 is provided near the print roll 32. The infrared sensor 66 is connected to a marking determining unit 68, thereby constructing a marking determining apparatus 70. The infrared sensor 66 detects an infrared ray (heat ray) emitted from a predetermined region on the X-ray film 12 passed along the print roll 32, and outputs an electric signal (voltage) according to the amount of the detected heat ray to the marking determining unit 68. That is, the infrared sensor 66 serves as a temperature sensor used for detecting the surface temperature of an object to be measured in a non-contact manner.

When the emulsion layer 16 in the X-ray film 12 as an object to be measured is irradiated with the laser beam LB, the thermal energy of the laser beam LB is absorbed, and melting occurs in the emulsion layer 16 or the base layer 14 in which the emulsion layer 16 is provided. At this time, the temperature in the irradiation position of the laser beam LB in the X-ray film 12 rises. According to an increased temperature, an infrared ray is emitted from the irradiation position of the laser beam LB in the X-ray film 12.

The infrared sensor 66 absorbs the infrared ray emitted from the surface of the X-ray film 12 and outputs a voltage v according to the amount of the absorbed infrared ray to the marking determining unit 68.

As shown in FIGS. 4 and 5, in the marking apparatus 10 applied to the embodiment, as an example, the infrared sensor 66 is disposed so as to be inclined only by a predetermined angle from the line perpendicular to the surface of the X-ray film 12, on the downstream side in the feed direction of the X-ray film 12 with respect to the marking head 46. The infrared sensor 66 detects the infrared ray emitted from the predetermined region in the surface of the X-ray film 12.

In the embodiment, the inclination angle of the infrared sensor 66 at this time is 40°. However, the inclination angle is not limited to 40°. The infrared sensor 66 can be inclined at an arbitrary angle as long as it can reliably detect an infrared ray emitted from the predetermined region in the surface of the X-ray film 12 without being influenced by the laser beam LB emitted from the marking head 46.

In the embodiment, the infrared sensor 66 is disposed on the downstream side in the feed direction of the X-ray film 12 of the marking head 46. However, the invention is not limited to the arrangement. Alternatively, the infrared sensor 66 may be disposed on the upstream side of the marking head 46.

As shown in FIGS. 3 and 5, a detection region 74 on the X-ray film 12, of the infrared sensor 66 is on the downstream side in the feed direction of the X-ray film 12, of a scan line 72 as the irradiation position of the laser beam LB. When the dots 16A are formed in the X-ray film 12 by irradiation of the laser beam LB, a plurality of dots 16A are formed in the detection region 74.

In FIGS. 3 and 5, the scan line 72 as the scan position of the laser beam LB on the X-ray film 12 is indicated by a dashed line, and the detection region 74 on the X-ray film 12 by the infrared sensor 66 is indicated by a double dashed line.

The infrared sensor 66 detects an infrared ray emitted from each of the plurality of dots 16A generated on completion of the irradiation of the laser beam LB and outputs the voltage v according to the region of the detected infrared ray.

Specifically, in the dot 16A formed by irradiation of the laser beam LB, after completion of the irradiation of the laser beam LB, the temperature gradually decreases. However, the infrared ray is emitted even during the temperature decrease. The infrared sensor 66 also detects the infrared ray emitted from the dot 16A being cooling.

In the detection region 74 of the infrared sensor 66, the irradiation position (scan line 72) of the laser beam LB is included. Consequently, the infrared sensor 66 detects not only the infrared ray emitted from the dot 16A in which irradiation of the laser beam LB has been finished but also infrared rays emitted from the emulsion layer 16 and the base layer 14 (dot 16A) being melted by irradiation with the laser beam LB, and outputs the voltage v according to the amount of the detected infrared rays.

In the embodiment, as an example, the dots 16A each having a diameter of 0.2 mm are formed at a pitch of 0.2 mm, and the spot diameter (radius) of the infrared sensor 66 is set to 2.0 mm. By inclining the infrared sensor 66 at an angle, the detection region 74 on the X-ray film 12 becomes an ellipse shape as shown in FIG. 3.

FIG. 6A shows the output (voltage v) of the infrared sensor 66 according to the center position (spot center) of the detection region 74 of the infrared sensor 66 with respect to the marking center position as the irradiation position (scan line 72) of the laser beam LB when the X-ray film 12 is moved at the line speed of 10 m/min. The horizontal axis shows a deviation amount to the downstream side in the feed direction of the X-ray film 12, of the spot center position from the marking center position.

As described above, in order to detect the infrared ray emitted from the dot 16A at the time of forming the dot 16A on the X-ray film 12, it is the most preferable to make the marking center and the spot center coincide with each other. However, by setting the spot center of the infrared sensor 66 so that at least the marking center lies in a detection region 74A, the infrared ray emitted from the dot 16A can be detected.

FIG. 6B shows measurement values of the voltage v output from the infrared sensor 66 according to the line speed when the spot center of the infrared sensor 66 is moved to the downstream side in the feed direction of the X-ray film 12 with respect to the marking center. The negative (−) side of the horizontal axis denotes that the spot center is at the upstream side of the marking position. The marking apparatus 10 can make a mark while feeding the X-ray film 12 at the feed speed of 0 to 200 m/min. As an example of the line speed, 10 m/min (rhombus mark), 50 m/min (rectangular mark), 100 m/min (triangle mark), and 150 m/min (circular mark) can be selected.

As shown in FIG. 6B, when the spot position is moved to the upstream side in the feed direction of the X-ray film 12, heat emitted from the dot 16A cannot be efficiently detected, so that an output of the infrared sensor 66 largely decreases. However, by slightly moving the spot position to the downstream side in the feed direction of the X-ray film 12, a stable output can be obtained.

With respect to the spot diameter of 2.0 mm, by setting the deviation of the spot position from the marking position to the range from 1 mm to 3 mm to the downstream side of the feed direction of the X-ray film 12, irrespective of the feed speed of the X-ray film 12, a relatively large output can be obtained from the infrared sensor 66.

By detecting infrared rays emitted from the plurality of dots 16A including the processed dots which have passed the marking position, a stable large output can be obtained from the infrared sensor 66. As the output of the infrared sensor 66 becomes larger (higher), the S/N ratio of an output signal of the infrared sensor 66 improves.

FIG. 6C shows a result of measurement of outputs of the infrared sensor 66 in accordance with distance of sight (distance of focusing) as the distance of the X-ray sensor 66 from the spot center on the X-ray film 12 in the case where the infrared sensor 66 is disposed at the downstream side in the feed direction of the X-ray film 12, and is inclined at a predetermined angle (40°) from the vertical direction of the X-ray film 12 to the feed direction of the X-ray film 12 ("downstream" in FIG. 6C), and in the case where the infrared sensor 66 is disposed in a width direction (the width direction is orthogonal to the feed direction of the X-ray film 12 direction) side with respect to the spot center, and is inclined at a predetermined angle (40°) from the vertical direction of the X-ray film 12 to the width direction of the X-ray film 12 ("side" in FIG. 6C). The measurement was performed by using the infrared sensor 66 of which standard distance of sight, which is the distance from the spot center on the X-ray film 12 to the infrared sensor 66, is 90 mm when the line speed is set to 10 m/min.

As shown by the measurement result, by disposing the infrared sensor 66 on the downstream side in the feed direction of the X-ray film 12, even when the distance of sight becomes long, an output does not become largely low.

On the other hand, to improve the productivity of the marking apparatus 10, the line speed of the X-ray film 12 has to be increased. In this case, to properly determine whether the marking pattern MP formed on the X-ray film 12 is proper or not by using the infrared ray emitted from the X-ray film 12, an infrared sensor having extremely high responsiveness and high sensitivity has to be used. In this case, however, the larger size of the apparatus and the higher cost are necessary.

Figure 7A:
FIGS. 7A and 7B are diagrams showing changes in the output voltage of the infrared sensor according to line speed of an X-ray film.
Figure 7B:
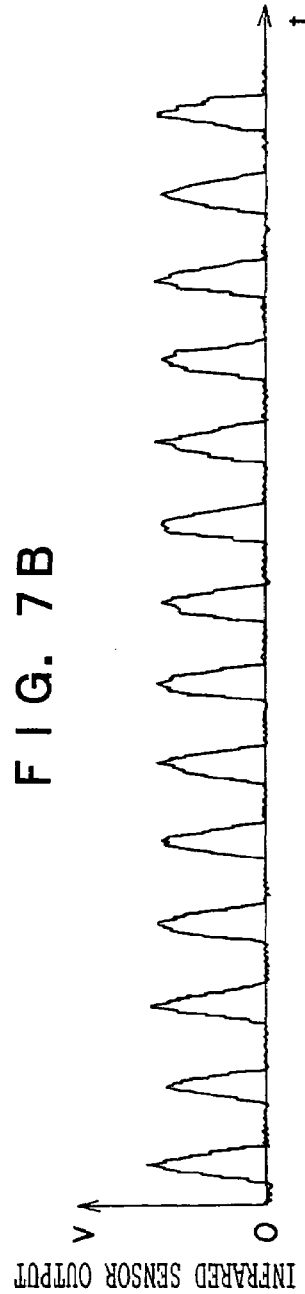

FIGS. 7A and 7B show changes in the output voltage of the infrared sensor 66 when the marking pattern MP is formed on the X-ray film 12 by using the infrared sensor 66 having the above-described configuration.

FIG. 7A shows the outputs of the infrared sensor 66 when the line speed of the X-ray film 12 is set to a speed close to 0 m/min. FIG. 7B shows outputs in the case where the line speed is set to 150 m/min. When the line speed is low, outputs of the infrared sensor 66 change according to a dot array of the marking pattern MP. Also in the case where the line speed is high, an output change according to the marking pattern MP can be obtained.

In other words, from the viewpoint of responsiveness and detection sensitivity, due to the structure mentioned above, by using the infrared sensor 66 by which it is difficult to detect the dot 16A being melted when simply irradiated with the laser beam LB, outputs according to the marking pattern MP are obtained.

As shown in FIG. 4, to the marking controller unit 56, the rotary encoder 60 for outputting a pulse signal according to the rotational angle of the print roll 32 is connected. The marking controller unit 56 counts pulse signals supplied from the rotary encoder 60, integrates the travel amounts of the X-ray film 12 and starts the marking head 46 to output a pattern signal so as to perform marking each time the travel amount of the X-ray film 12 as an integration value reaches a predetermined amount.

The marking controller unit 56 outputs a trigger signal Tgs indicative of start of marking at timings the laser driver unit 54 starts outputting a drive signal Os and a deflection signal Ps. At a timing the laser driver unit 54 stops outputting the drive signal Os and the deflection signal Ps after completion of marking of one pattern, the marking controller unit 56 outputs a trigger signal Tge indicative of completion of marking to the marking determining unit 68.

In other words, to the marking determining unit 68, irrespective of the travel speed of the X-ray film 12, the trigger signal Tgs is input each time the travel amount of the X-ray film 12 reaches a preset amount, and the trigger signal Tge is input on the basis of the timing the scanning of the laser beam LB finishes.

Consequently, the marking determining unit 68 can determine whether marking is being performed on the X-ray film 12 on the basis of the trigger signals Tgs and Tge. Whether the marking is being performed or not can be determined at least by using the trigger signal Tgs, so that it is sufficient that at least the trigger signal Tgs is input.

Meanwhile, in the marking determining unit 68, a threshold value is set for the voltage v supplied from the infrared sensor 66. The marking determining unit 68 compares the threshold value with the voltage v, thereby determining whether proper marking is performed or not.

First, the marking determining process performed by the marking determining unit 68 will be described with reference to the flowchart of FIG. 8.

The flowchart is executed, for example, when the marking apparatus 10 starts the process of feeding the X-ray film 12, and is finished by stopping feeding of the X-ray film 12 (the process of marking the X-ray film 12 by the marking apparatus 10) in a state where a print error of the marking pattern MP is not detected. A result of determination is output at a timing when the trigger signal Tgs indicative of a marking start timing is turned on.

In the flowchart, the voltage v output from the infrared sensor 66 is read at predetermined time intervals (step 100). The time is set, for example, on the basis of response time of the infrared sensor 66. The time is short in a sensor having high responsiveness. The time is long in a sensor having low responsiveness.

In the marking determining unit 68, a threshold Th which is preset on the basis of responsiveness and precision of the infrared sensor 66, the marking pattern MP formed on the X-ray film 12, the number of dots 16A in the detection region 74, and the like is stored.

The threshold Th is set, for example, on the basis of the voltage v output from the infrared sensor 66 when a proper marking pattern MP is formed on the X-ray film 12. Consequently, the threshold Th can be set on the basis of the number of dots 16A (including the dot 16A passed) in the detection region 74, the amount of infrared rays emitted from each of the dots 16A, and the like in the response time of the infrared sensor 66.

In step 102, whether the read voltage v reaches the threshold Th or not is determined. If the voltage v reaches or exceeds the threshold Th ("Yes" in step 102), the program advances to step 104 where a determination flag F is set (F=1). The determination flag F is reset prior to execution of the flowchart.

The X-ray film 12 is irradiated with the laser beam LB and the plurality of dots 16A constructing the marking pattern MP are formed. When the voltage v output from the infrared sensor 66 reaches the threshold Th, the determination flag F is set. When proper dots 16A are not formed on the X-ray film 12 due to, for example, irradiation with the laser beam is not performed, decrease in output of the laser beam LB, or the like the determination flag is reset (F=0).

While recognizing the voltage v output from the infrared sensor 66, in step 106, whether the trigger signal Tgs indicative of start of scanning of the laser beam LB for forming the marking pattern MP is supplied from the marking controller 58 or not is determined. In step 108, whether the trigger signal Tge indicating that formation (printing) of one marking pattern MP is finished and irradiation of the laser beam LB is finished is input or not is determined.

When the trigger signal Tgs is input from the marking controller 58 ("Yes" in step 106), the program advances to step 110. In step 110, whether an output of the infrared sensor 66 exceeds the threshold Th or not during the period from the state of the determination flag F until the trigger signal Tgs is input is determined. If the determination flag F is in the reset state (F=0) ("No" in step 110), the program returns to step 100 and reading of an output from the infrared sensor 66 is newly started.

When the trigger signal Tge is input ("Yes" in step 108), the program moves to step 112. In step 112, if the determination flag F is in the set state (F=1) ("Yes" in step 112), the program moves to step 114, where the determination flag is reset, thereafter, the process from step 100 is newly started.

Specifically, in the marking apparatus 10, during the period since the trigger signal Tgs is output from the marking controller 58 until the trigger signal Tge is output, the X-ray film 12 is scanned and irradiated with the laser beam LB to form the marking pattern MP.

Figure 9A:
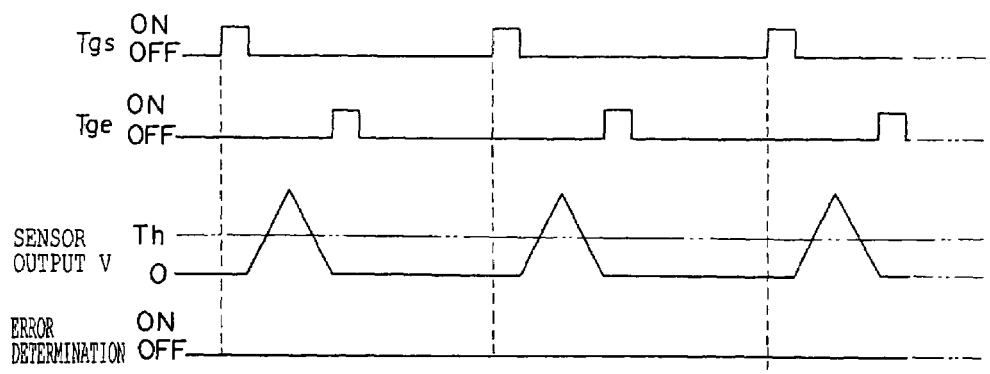
FIGS. 9A to 9C are timing charts schematically showing output voltages of the infrared sensor and determination of a print error in accordance with trigger signals Tgs and Tge.

As shown in FIG. 9A, when proper marking is performed on the X-ray film 12, during the period from the trigger signal Tge is input until the trigger signal Tgs is input, an output of the infrared sensor 66 does not exceed the threshold Th because of the non-printing region, and the determination flag F is held in the reset state. During the period from the trigger signal Tgs is input until the trigger signal Tge is input, the determination flag F is in the set state (F=1).

In contrast, for example, in spite of the fact that the marking signal Ms is output from the marking controller unit 56, there is a case such that the laser driver unit 54 is not started. Or a case such that although the drive signal Os and the deflection signal Ps are output from the laser driver 54, the laser head 46 is not driven.

Figure 9B:
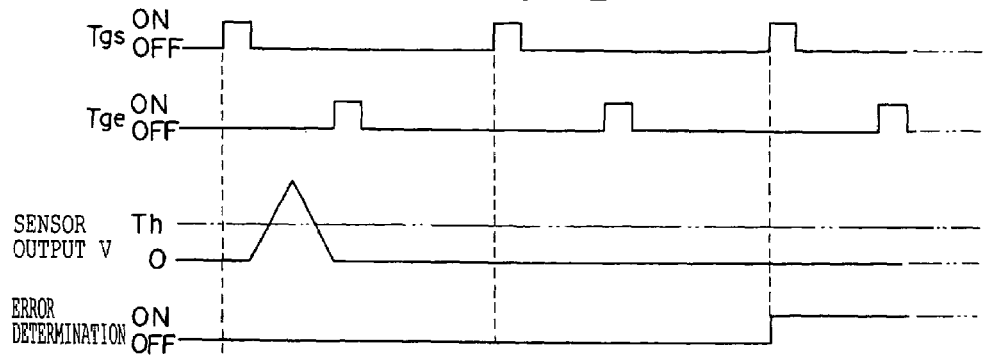

In this case, as shown in FIG. 9B, the output of the infrared sensor 66 after input of the trigger signal Tgs does not reach the threshold Th, and the determination flag F is in the reset state.

Figure 8:
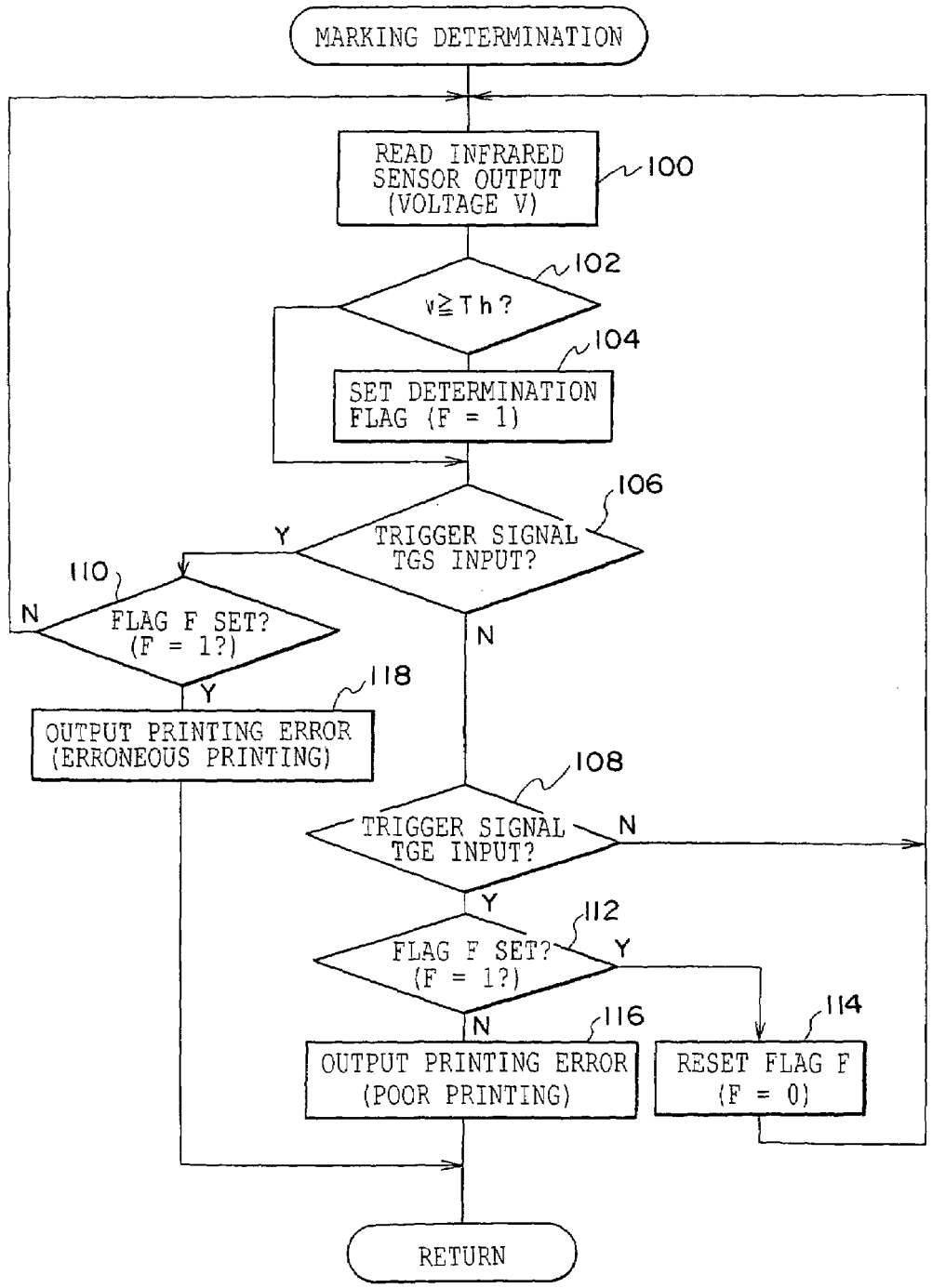
FIG. 8 is a flowchart showing an example of marking determination using the infrared sensor.

In the flowchart of FIG. 8, "No" is determined in step 112 and the program advances to step 116. In step 116, it is determined that poor printing occurs, and a print error is output. A timing of outputting the print error is a timing at which the next trigger signal Tgs is turned on as described above (refer to FIG. 9B).

There are also cases such that, due to noise or the like, the laser driver unit 54 outputs the drive signal Os, the laser driver unit 54 outputs the drive signal Os and the deflection signal Ps to thereby drive the marking head 46, and the laser beam LB is emitted from the marking head 46 toward the X-ray film 12 although the drive signal Os is not input.

Figure 9C:
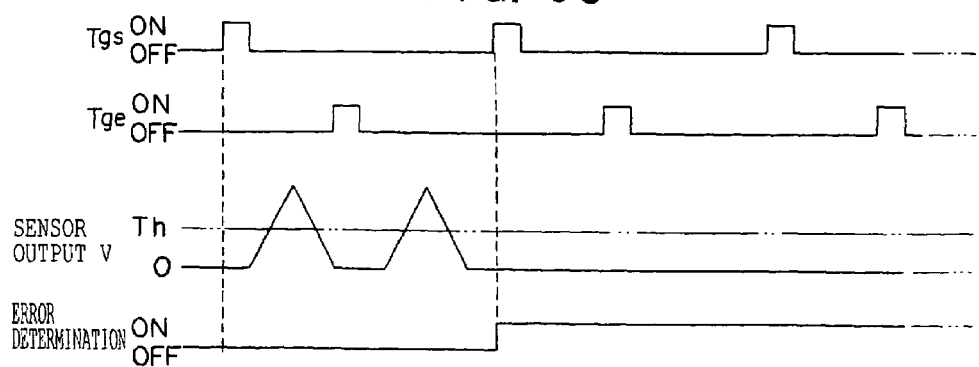

In such cases, as shown in FIG. 9C, an output of the infrared sensor 66 after the trigger signal Tge is input exceeds the threshold Th and the determination flag F is set.

In the flowchart of FIG. 8, "Yes" is determined in step 110, and the program advances to step 118. In step 118, erroneous printing such that printing is performed in the non-printing region occurs, and a print error is output at a timing the trigger signal Tgs is turned on next (refer to FIG. 9C).

As described above, in the marking determining unit 68, when the infrared sensor 66 is used, by making the plurality of dots 16A included in the detection region 74 of the infrared sensor 66 on the downstream side of the feed direction of the X-ray film 12, of the scan line 72 as the irradiation position of the laser beam LB, erroneous printing, poor printing, and the like on the X-ray film 12 can be detected with reliability irrespective of the responsiveness and detection precision of the infrared sensor 66.

By including the scan line 72 as the irradiation position of the laser beam LB in the detection region 74 of the infrared sensor 66, erroneous printing and poor printing can be reliably detected at higher precision.

In the marking apparatus 10, when a print error is detected, the marking process on the X-ray film 12 is interrupted in a state where the print error occurs by, for example, stopping the feeding of the X-ray film 12.

In such a manner, a loss caused by production of an X-ray film in which a printing error occurs can be prevented.

Since the feed amount of the X-ray film 12 is measured by the marking controller 58, when a signal indicative of determination of a print error is supplied from the marking determining unit 68, a region in which the printing error occurs is specified. The portion may be extracted after the marking process is performed on the X-ray film 12 or when a new process is performed on the X-ray film 12 subjected to the marking process.

In such cases, it is unnecessary to interrupt the marking process on the X-ray film 12. Consequently, without decreasing the productivity of the X-ray film 12, the X-ray film 12 having the region in which a printing error occurs can be prevented from being produced with reliability.

Although occurrence of erroneous printing and poor printing is detected in the foregoing embodiment, by improving the responsiveness and detection precision of the infrared sensor 66, the detection region 74 can be narrowed. Simultaneously, by properly setting the threshold Th in accordance with a dot pattern formed on the X-ray film 12, whether a predetermined character or symbol is properly formed on the X-ray film 12 or not can be also determined.

In the case of detecting whether poor printing such as a dot dropout occurs or not at the time of forming a marking pattern in a printing region, preferably, the threshold Th is set to be high in accordance with a dot pattern such as a character or symbol forming the marking pattern MP. At the time of detecting erroneous printing such that a character, a dot, or a dot pattern is formed in the non-printing region, the threshold Th is preferably low.

It is also possible to set different thresholds Th in the non-printing region and the printing region and determine a print error by switching the threshold Th between the non-printing region and the printing region.

Figure 10:
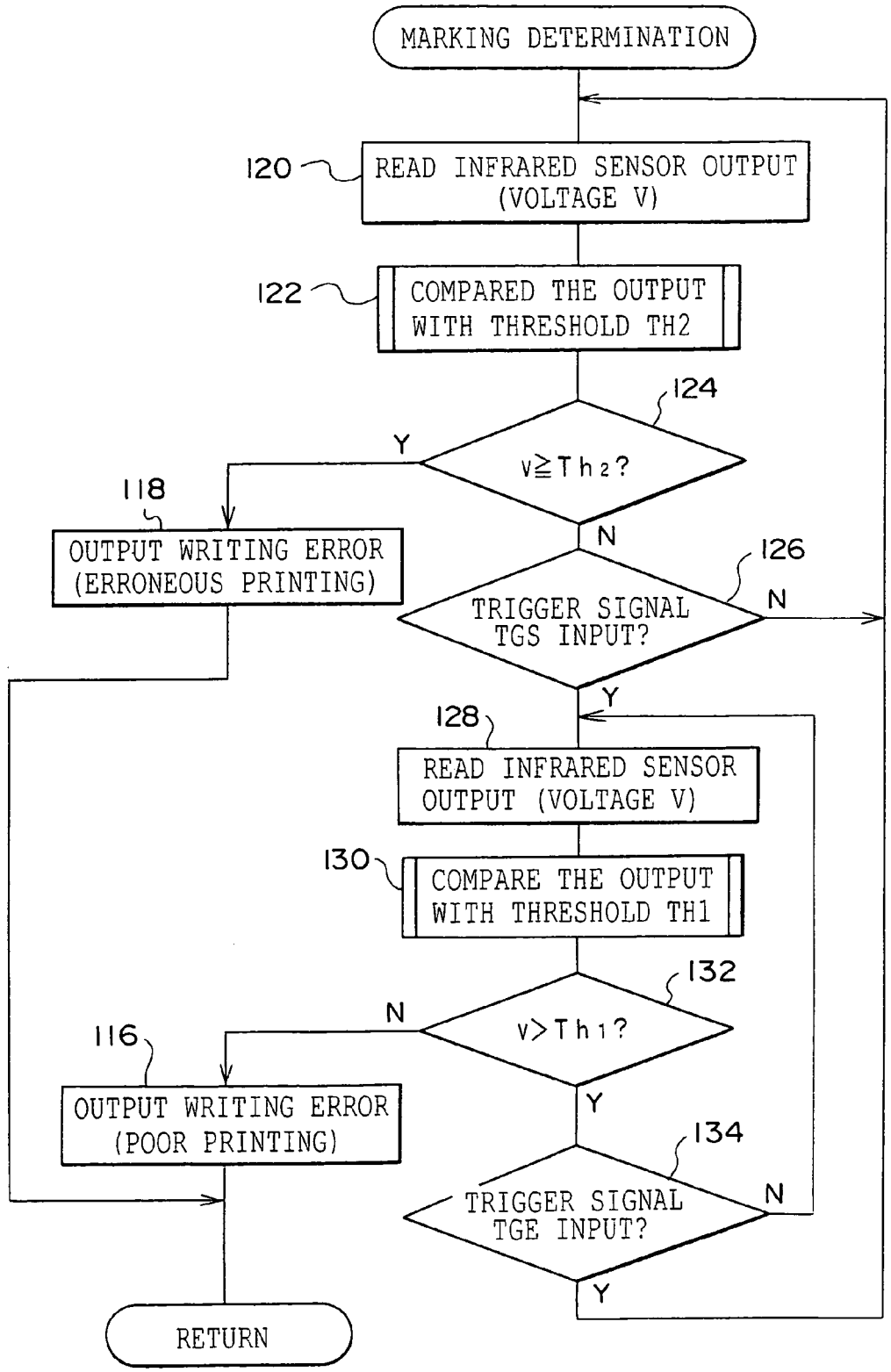
FIG. 10 is a flowchart showing another example of marking determination.

FIG. 10 schematically shows the printing error determining process. In FIG. 10, the threshold in the printing region is set as a threshold Th1, and the threshold in the non-printing region is set as a threshold Th2 (where Th1>Th2) In the flowchart, a timing of outputting a print error can be matched with the timing of turning on the trigger signal Tgs.

In the flowchart, in the first step 120, the voltage v output from the infrared sensor 66 is read. In the following step 122, the read voltage v is compared with the threshold Th2 set in the non-printing region. In step 124, whether the voltage v exceeds the threshold Th2 or not is checked.

If the voltage v does not exceed the threshold Th2 ("No" in step 124), the program advances to step 126 where whether the trigger signal Tgs is input or not is checked.

When the trigger signal Tgs is input ("Yes" in step 126) the program advances to step 128 where the voltage v output from the infrared sensor 66 is read. After that, in step 130, the voltage v is compared with the threshold Th1 that is set in the printing region. In step 132, whether the voltage v exceeds the threshold Th1 or not is checked. When the voltage v exceeds the threshold Th1 ("Yes" in step 132), the program advances to step 134 where whether the trigger signal Tge is input or not is checked. When the trigger signal Tge is input ("Yes" in step 134), the program returns to step 120.

If the voltage v output from the infrared sensor 66 exceeds the threshold Th2 in the non-printing region ("Yes" in step 124) the program moves to step 118 where a signal indicative of occurrence of a print error (erroneous printing) is output.

At this time, by setting the threshold Th2 to be low, for example, even when the laser oscillator 48 starts operating by chance and one or a small number of dots 16A are formed, the erroneous printing can be detected with reliability.

When one or a small number of (plurality of) dots 16A is/are dropped out in the printing region, the voltage v output from the infrared sensor 66 decreases. Accordingly, when the voltage v does not reach the threshold Th1 ("No" in step 132) the program moves to step 116 where a print error indicative of poor printing can be output.

By switching the threshold Th (thresholds Th1 and Th2) between the printing region and the non-printing region, occurrence of a print error can be detected more reliably.

As shown in FIG. 6B, irrespective of the feed speed of the X-ray film 12, outputs of the infrared sensor 66 become stable. Consequently, for example, when a new X-ray film 12 is connected to an X-ray film 12 being processed in order to process a number of X-ray films 12 continuously, although the feed speed of the X-ray film 12 may decrease or the feeding is stopped, a print error can be detected accurately.

Figure 11A:
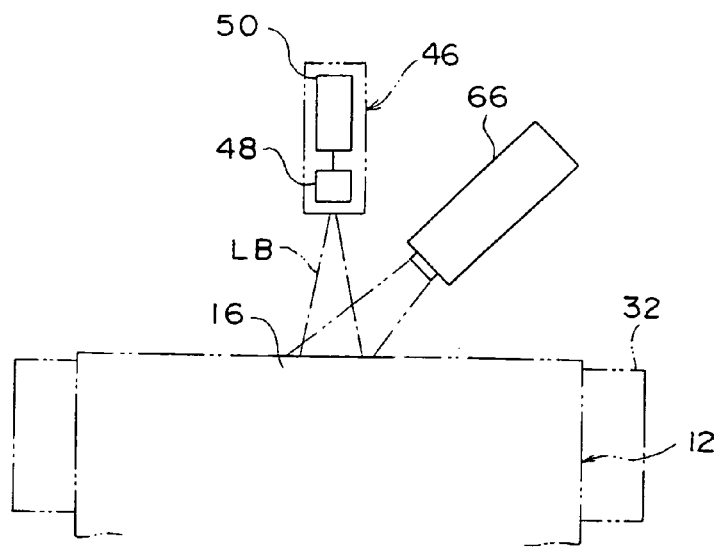
FIG. 11A is a schematic diagram of a portion around a print roll as another example of layout of the infrared sensor.

Although the infrared sensor 66 is disposed on the downstream side in the feed direction of the X-ray film 12 in the embodiment, as shown in FIG. 11A, the infrared sensor 66 may be disposed on the width direction side of the X-ray film 12.

Figure 11B:
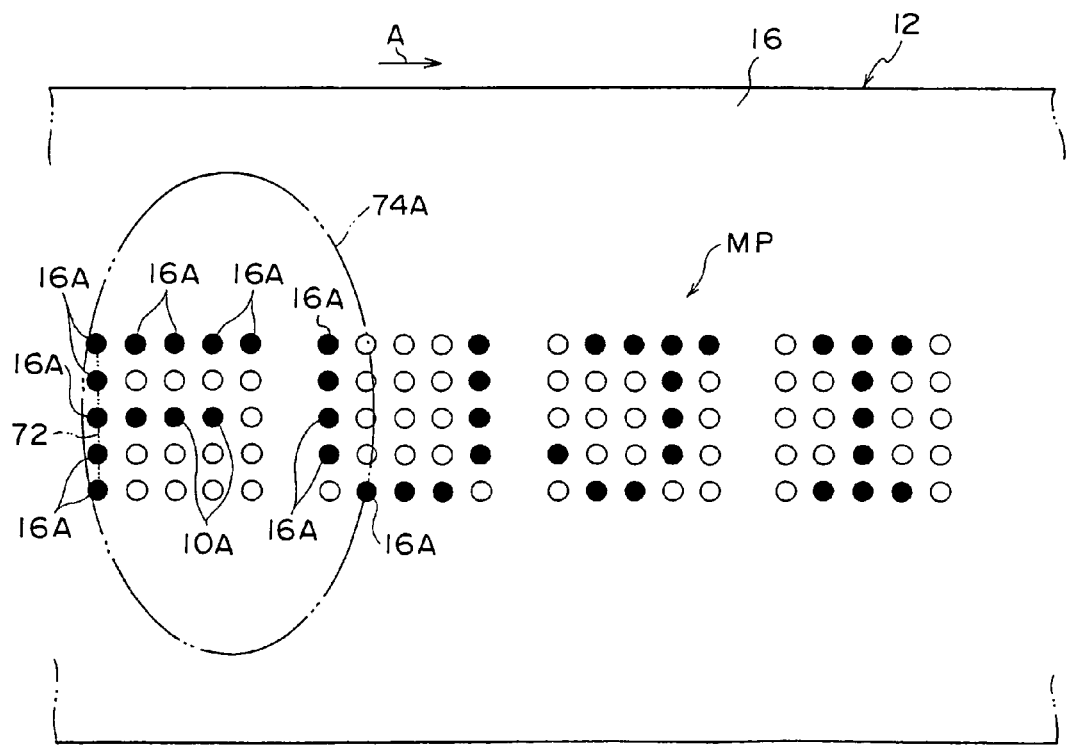
FIG. 11B is a schematic diagram showing a detection region on an X-ray film in the layout of FIG. 11A.

At this time, as shown in FIG. 11B, the detection region 74A of the infrared sensor 66 has an oval shape of which major axis direction corresponds to the direction orthogonal to the printing direction of the marking pattern MP.

The foregoing embodiment is an example of the invention and does not limit the configuration of the invention. For example, the threshold Th is prestored in the marking determining unit 68 in the embodiment. The invention however is not limited to the embodiment but the threshold Th which is set in accordance with the pattern signal of the dot pattern (marking pattern MP) formed on the X-ray film 12 may be input. Alternately, the threshold Th may be input by a not-shown key operation by an operator or the like in accordance with an operating state of the marking apparatus 10.

In the flowcharts of FIG. 8 and FIGS. 9A to 9C, the printing region and the non-printing region are switched on the basis of the trigger signals Tgs and Tge. The invention is not limited to the method. The printing region and the non-printing region may be determined on the basis of the trigger signal Tgs and printing time of the marking pattern MP. In this manner, proper determination using at least only the trigger signal Tgs can be made.

Although a result of determination (print error) is output at timing the trigger signal Tgs is turned on in the embodiment, it is sufficient to output a result of determination at an arbitrary timing.

Further, in the embodiment, the scan line 72 is included in the detection region 74 of the infrared sensor 66. It is sufficient that a plurality of dots 16A are included in the detection region 74 of the infrared sensor 66 on the downstream side of the feed direction of the X-ray film 12, of at least the scan line 72.

Although the $CO_2$ laser beam is used to form the optimum dot 16A on the X-ray film 12 in the embodiment, the invention is not limited to the $CO_2$ laser beam but an arbitrary laser beam of any of various semiconductor lasers can be used.

In the embodiment, marking on the X-ray film 12 as a photosensitive material for medical use has been described as an example. The invention is not limited to the embodiment but can be also applied to marking on a photosensitive material of an arbitrary configuration and for arbitrary use. The invention is not limited to the photosensitive material but can be applied to marking for an arbitrary sheet member as a material to be printed.

As described above, according to the invention, an infrared ray emitted from each of a plurality of dots formed on a material to be printed by being irradiated with a laser beam on the downstream side in the feed direction of the material to be printed can be detected by the infrared sensor.

Thus, an excellent effects such that an accurate marking determination can be made irrespective of responsiveness and detection precision of the infrared sensor can be obtained.

What is claimed is:

1. A method for determining whether a marking is proper, comprising:

forming a marking pattern by forming and arranging a plurality of dots in a predetermined position on a material to be printed with irradiation of a laser beam while feeding the material in a feed direction to be printed, disposing an infrared sensor so as to be able to detect the plurality of dots after irradiation of the laser beam, which are formed on the material to be printed, on the downstream side in the feed direction of the material to be printed with respect to an irradiation position of the laser beam, and determining whether the marking is proper or not by comparing an output of the infrared sensor, which includes an amount of infrared rays emitted from the finished plurality of dots and the amount of infrared rays emitted from the material being melted by the irradiation of the laser beam, with a preset threshold.

2. The proper marking determining method according to claim 1, wherein the irradiation position of the laser beam onto the material to be printed is included in a detection region of the infrared sensor for the infared ray from the material to be printed.

3. The proper marking determining method according to claim 1, wherein when an output of the infrared sensor is less than the preset threshold in a marking region in which the marking pattern is to be formed on the material to be printed, poor printing is determined.

4. The proper marking determining method according to claim 1, wherein when an output of the infrared sensor exceeds the preset threshold in a region out of a marking region in which the marking pattern is to be formed on the material to be printed, erroneous printing is determined.

5. The proper marking determining method according to claim 1, wherein a center position of a detection region of the infrared sensor for the infrared ray from the material to be printed is positioned at the downstream side in the feed direction of the material to be printed with respect to the irradiation position of the laser beam onto the material to be printed.

6. The proper marking determining method according to claim 1, wherein when an output of the infrared sensor is less than a first threshold in a marking region in which the marking pattern is to be formed on the material to be printed, poor printing is determined, and when an output of the infrared sensor exceeds a second threshold in a region out of the marking region, erroneous printing is determined.

7. The proper marking determining method according to claim 6, wherein the first threshold is larger than the second threshold.

8. A proper marking determining apparatus for determining whether marking on a material to be printed is proper or not, the marking being formed by a marking apparatus which includes: a carrying section for carrying the material to be printed; a laser oscillating section capable of forming a dot by irradiating the material to be printed which is carried by the carrying section with a laser beam at a predetermined position; a laser control section for controlling the laser oscillating section to form a marking pattern by arranging dots in a predetermined position in the material to be printed, the proper marking determining apparatus comprising:

- An infrared sensor provided so as to be able to detect a plurality of finished dots, which are formed on the material to be printed by irradiation with laser beams, on the downstream side in the feed direction of the material to be printed with respect to an irradiation position of the laser beam on the material to be printed, which position is irradiated with the laser beam oscillated by the laser oscillating section; and
- A determining section for determining whether marking on the material to be printed is proper or not by comparing an output of the infrared sensor, which includes an amount of an infrared ray emitted from the finished plurality of dots and the amount of infrared rays emitted from the material being melted by the irradiation of the laser beam, with a preset threshold.

9. The proper marking determining apparatus according to claim 8, wherein the irradiation position of the laser beam onto the material to be printed is included in a detection region of the infrared sensor for the infrared ray from the material to be printed.

10. The proper marking determining apparatus according to claim 8, wherein the determining section determines poor printing when an output of the infrared sensor is less than the preset threshold in a marking region in which the marking pattern is to be formed on the material to be printed.

11. The proper marking determining apparatus according to claim 8, wherein the determining section determines erroneous printing when an output of the infrared sensor exceeds the preset threshold in a region out of a marking region in which the marking pattern is to be formed on the material to be printed.

12. The proper marking determining apparatus according to claim 8, wherein when the marking apparatus outputs at least a trigger signal indicative of start of irradiation of the material to be printed with a laser beam, the determining section determines whether marking is proper or not on the basis of the trigger signal.

13. The proper marking determining apparatus according to claim 8, wherein a center position of a detection region of the infrared sensor for the infrared ray from the material to be printed is positioned at the downstream side in the feed direction of the material to be printed with respect to the irradiation position of the laser beam onto the material to be printed.

14. The proper marking determining apparatus according to claim 8, wherein when an output of the infrared sensor is less than a first threshold in a marking region in which the marking pattern is to be formed on the material to be printed, poor printing is determined, and when an output of the infrared sensor exceeds a second threshold in a region out of the marking region, erroneous printing is determined.

15. The proper marking determining apparatus according to claim 14, wherein the first threshold is larger than the second threshold.

* * * * *